April 24, 1956  H. E. HOLLMANN  2,743,417
SPEEDOMETER

Filed June 13, 1952  2 Sheets-Sheet 1

INVENTOR.
Hans E. Hollmann.
BY
A R McCurdy
ATTORNEYS.

April 24, 1956     H. E. HOLLMANN     2,743,417
SPEEDOMETER

Filed June 13, 1952                          2 Sheets-Sheet 2

INVENTOR.
Hans E. Hollmann
BY
A R McCrady
ATTORNEYS.

United States Patent Office 2,743,417
Patented Apr. 24, 1956

2,743,417

SPEEDOMETER

Hans E. Hollmann, Oxnard, Calif., assignor to the United States of America as represented by the Secretary of the Navy Application June 13, 1952, Serial No. 293,496

3 Claims. (Cl. 324—68)

(Granted under Title 35, U. S. Code (1952), sec. 266)

The invention described herein may be manufactured and used by or for the Government of the United States of America for governmental purposes without the payment of any royalties thereon or therefor.

This invention relates to a timer of the type wherein the time standard is a capacitor discharging through a resistor.

It is often desirable to measure accurately the velocity of a moving object such as, for example, a guided missile or a pilotless aircraft as it moves along the launching ramp. The device used for such a purpose should be accurate within 1%, capable of covering a range of at least 50 to 150 knots, and inexpensive to construct since numbers of them may be used on a ramp. Timers employing characteristics of a capacitor discharging through a resistor as a time standard have been generally non-linear and of limited range. In the instant invention, the calibration means relates voltage on the capacitor to certain voltage ratios so that an absolute calibration of the initial charging voltage and of the voltage measuring means is not necessary, and the voltage instrument scale is linear in units of velocity which may be read directly.

An object of the invention is to provide an improved apparatus wherein the characteristics of a discharging capacitor are utilized for reliably and accurately measuring time intervals.

Other objects and many of the attendant advantages of this invention will be readily appreciated as the same becomes better understood by reference to the following description.

Figure 1:
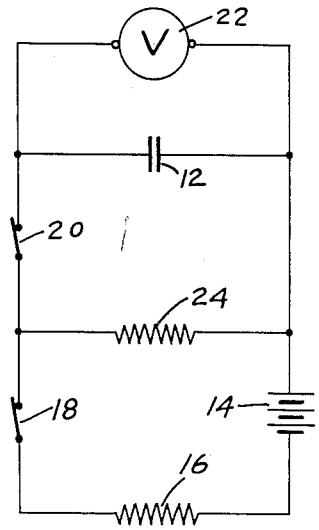
Fig. 1 is a simplified diagram of a timer circuit of a known type.

The circuit shown in Fig. 1 illustrates the theory of one known type of capacitor speedometer described herein for purposes of reference. It includes capacitor 12 which may be charged by means of battery 14. The charging current flows through charging resistor 16 and switches 18 and 20. A low drain voltmeter 22 is connected as shown across capacitor 12, and discharging resistor 24 is also connected across capacitor 12.

In the operation of the above described device, capacitor 12 is charged by means of battery 14. The movement of the object to be timed causes switch 18 to be opened thus disconnecting the battery and allowing the capacitor to start discharging through resistor 24. The discharge continues until switch 20 is opened by further travel of the object. The charge on capacitor 12 will then remain constant, except for leakage, and the charge may be measured by means of voltmeter 22. Switches 18 and 20 may be any one of many known forms such as, for example, frangible conductors positioned in the path of a projection on the moving object and sequentially broken thereby. The two switches are separated by the basic distance L so that the time T, which elapses between actuation of both switches, is related to the velocity K in knots by the formula $$T = \frac{592}{K} L$$

where T is in milliseconds. If L is taken as one foot the equation reduces to $$T = \frac{592}{K}$$

This initial voltage $V_0$, at which the discharge starts, is determined by the battery voltage $V_B$ and by the resistance of resistors 16 and 24 designated as $R_{16}$ and $R_{24}$ respectively, according to the formula $$V_0 = \frac{V_B}{1 + \frac{R_{16}}{R_{24}}}$$

The momentary voltage V across capacitor 12 is related to the time by the equation $$V = V_0 e^{-\frac{T}{\theta}} = V_0 e^{-\frac{592}{K\theta} 10^{-3}}$$

in which $\theta$ is the discharging circuit time constant.

The time constant $\theta$ is equal to $C_{12}R_{24}$ with the capacitance of capacitor 12 expressed as $C_{12}$. The obvious disadvantages of the above described well known apparatus are that the final calibration depends upon absolute voltages and that the time-voltage curve is exponential and hence nonlinear.

Figure 2:
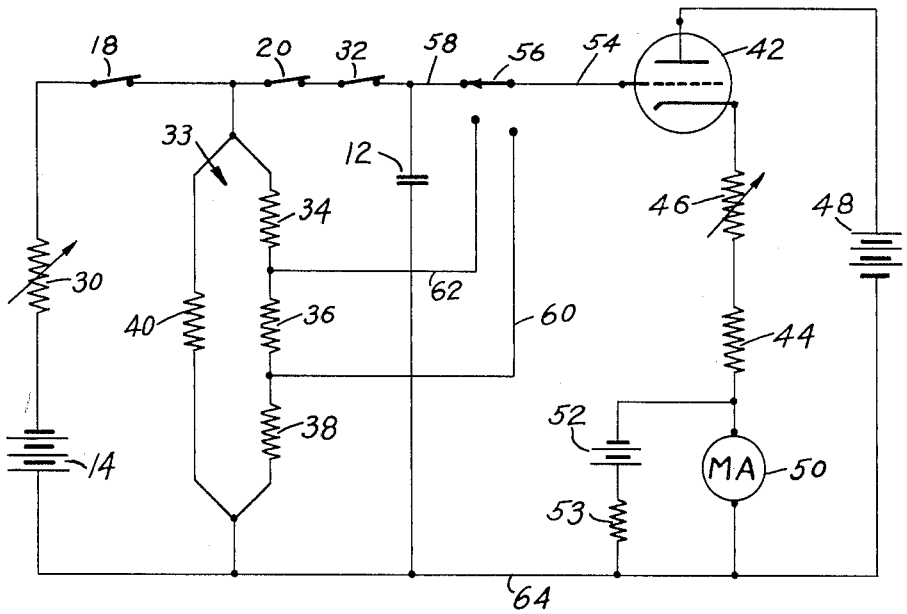
Fig. 2 is a circuit diagram of a speedometer embodying the invention.

Fig. 2 shows schematically a direct reading, linear scale speedometer. The charging battery 14 charges capacitor 12 through variable charging resistor 30 and switches 18, 20, and 32. The discharging network 33 includes series resistors 34, 36 and 38 shunted by resistor 40. Voltages across resistors 36 and 38 and capacitor 12 may be conveniently measured by means of a vacuum tube voltmeter shown in simplified form as a vacuum tube 42, cathode resistors 44 and 46, plate battery 48, plate current meter 50, battery 52 in series with resistance 53 connected across the meter, and lead 54 which serves to connect the grid of tube 42 to various circuit elements. By means of switch 56, the grid may be connected to capacitor 12 through lead 58 or to resistor 38 through lead 60 or to resistors 36 and 38 in series through lead 62. Lead 64 serves to connect the cathode of tube 42 to the element under test.

The purpose of battery 52 and resistor 53 is to produce a current opposing the current from plate battery 48 to suppress the zero point of the voltmeter scale. The purpose of resistors 44 and 46 as a high cathode resistance is to assure a strong degenerative feedback for making the voltmeter function linearly in accordance with well known techniques.

When the grid of tube 42 is connected to lead 62 the instrument needle of meter 50 must indicate the lower end mark corresponding to the high velocity that is to be measured. The indication may be corrected by means of variable resistor 30 which regulates the charging voltage. When the grid is connected to lead 60 the instrument must indicate the upper mark of its scale corresponding to the lowest velocity to be measured. This indication may be adjusted by varying adjustable resistor 46. The voltmeter calibration is referred entirely to the attenuation of network 33 thus making this resistance a calibrating attenuator, and the absolute voltages of batteries 14, 48, and 52 need not be known.

The range of the tube voltmeter determines the two limiting voltages. The following calculations describe the instrumentation for the range of 50 to 100 knots, but any other range may be selected provided that the maximum top speed to be observed is twice the minimum speed.

At $K=100$:

$$V_{100} = V_0 e^{-\frac{5.92}{\theta}10^{-3}}$$

And at $K=50$:

$$V_{50} = V_0 e^{-\frac{11.84}{\theta}10^{-3}}$$

Both expressions may be written in logarithmic form:

$$\log_e \frac{V_0}{V_{100}} = \frac{5.92}{\theta}10^{-3}$$

and $$\log_e \frac{V_0}{V_{50}} = \frac{11.80}{\theta}10^{-3} = 2\log_e \frac{V_0}{V_{100}}$$

so that $$\log_e \frac{V_0}{V_{50}} - \log_e \frac{V_0}{V_{100}} = \log_e \frac{V_{100}}{V_{50}} = \frac{5.92}{\theta}10^{-3} = \log_e \frac{V_0}{V_{100}}$$

This expression reveals the important attenuation factor $$N = \frac{V_{100}}{V_{50}} = \frac{V_0}{V_{100}}$$

that follows immediately from the discharging e-function because $$T_{100} = T_{50} - T_{100}$$

The time constant $\theta$ can be computed from the logarithmic equations as $$\theta = \frac{5.92}{\log_e N}10^{-3}$$

and is determined solely by the attenuation factor N.

The voltmeter characteristic, provided it is linear due to feedback and proper construction, can be presented by the formula $$S_{cd} = A(V_{100} - V)$$

in which $S_{cd}$ represents scale divisions, A is the voltmeter sensitivity, and V is the momentary voltage across the capacitor at any given time. The equation shows that there will be zero scale divisions at $V_{100}$ because of the compensation of the voltmeter plate current by the counter current from battery 52, and there will be full deflection as, for example, 50 scale divisions as $V_{50}$.

The complete calibration equation is obtained by expressing the voltmeter sensitivity A in terms of N:

$$A = \frac{S_{cd_0}}{V_0}\frac{N^2}{N-1}$$

where $S_{cd_0}$ denotes the full scale deflection. By combining equations, the expression $$S_{rel} = \frac{S_{cd}}{S_{cd_0}} = \frac{N}{N-1}\left[1 - N^{\left(1-\frac{100}{K}\right)}\right]$$

is derived which gives the relative scale divisions referred to the full range. Obviously, the final calibration depends only on the attenuation factor and not on any absolute voltages.

Figure 3:
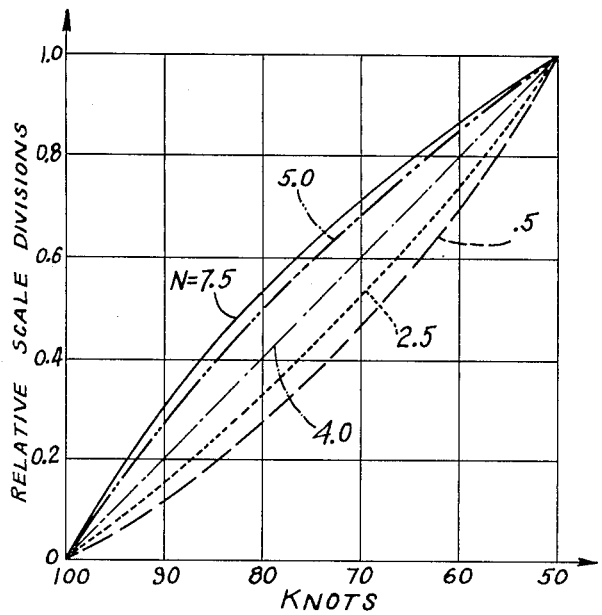
Fig. 3 is a graph showing calibration curves of various attenuation factors.

Fig. 3 shows a graph with a series of calibration curves derived from the above relative scale division equation. The relative scale divisions are plotted on the ordinate against speed as measured in knots on the abscissa for different values of the parameter N. Each curve representing a different value of N is labeled with the proper value.

The calibration curve is fundamentally nonlinear. The curvature is determined by the e-function in which the velocity K appears in the denominator of the exponent, thus producing a certain linearization depending on the logarithmic basis N. The calculated curves change from a concave to a convex form as the value of N decreases, passing an intermediate state at 4.1 which is a straight line. The deviation from the true value caused by various attenuation factors may be calculated; it is less than $\pm 0.5\%$ for the optimum value of 4.1 for N and the proportional deviation increases slowly as N is increased or decreased. The use of the optimum value of 4.1 for N permits the scale divisions to be marked directly with the actual velocities to be measured, within the limits of the desired accuracy, thus making a special calibration curve unnecessary. The linearization of the instrument scale is attainable because the capacitor discharge formula contains the velocity in the denominator of the exponent.

The attenuation factor N determines the individual subdivisions of resistance network 33 of Fig. 2.

The initial formula $$N = \frac{R_{34} + R_{36} + R_{38}}{R_{36} + R_{38}} = \frac{R_{36} + R_{38}}{R_{38}}$$

immediately gives $$R_{34} = (R_{34} + R_{36} + R_{38})\left(1 - \frac{1}{N}\right)$$

$$R_{36} = \frac{R_{34}}{N}$$

$$R_{38} = \frac{R_{34} + R_{36} + R_{38}}{N^2}$$

The total resistance of resistors 34, 36 and 38 may conveniently be 10,000 ohms so that the individual subdivisions, with N at an optimum of 4.1, become:

$R_{34} = 7,560$ ohms
$R_{36} = 1,844$ ohms
$R_{38} = 595$ ohms so the time constant may be calculated $$\theta = \frac{5.92 \cdot 10^{-3}}{\log_e 4.1} = 4.195 \text{ milliseconds}$$

and, assuming capacitor 12 to be 1 $\mu$f., the discharging resistor must be 4,195 ohms as shown by the equation $$R_{33} = \frac{4.195}{1} = 4,195 \text{ ohms}$$

This value of 4,195 ohms for resistance network 33 may be obtained by the use of shunt resistor 40 which must have a value of 7,230 ohms.

With the aid of the above information, the speedometer is calibrated within the limits of accuracy of Wheatstone and capacity bridges. Such calibration has proved to be consistently highly accurate as shown by tests in which time intervals measured by the speedometer are compared with the same time intervals measured by elaborate research instruments such as the Potter chronograph.

In the operation of the above described device, the grid of tube 42 is connected to lead 62 and the indication of meter 50 is adjusted by means of variable resistor 30 so the needle is on the lower end mark corresponding to the maximum speed that can be measured. The tube grid is then connected to lead 60 and the meter needle is adjusted, by means of variable resistor 46, to indicate the upper end mark corresponding to the minimum speed to be measured. Switch 32 is then closed and the missile fired as soon as desired after capacitor 12 has had time to charge up. After switches 18 and 20 have been opened by the object under test, switch 32 is opened manually, and the reading of the desired speed is taken directly from the dial of meter 50.

The purpose of switch 32 is to disconnect that part of the circuit in the vicinity of the ramp since conditions prevailing near the ramp after a firing may cause some discharge of capacitor 12 even though switches 18 and 20 are open. The rate of such discharge is slow and may not be evident at all. In order to obviate the possibility of discharge if there is a delay in opening switch 32, a micro relay may be connected across a resistor in the plate circuit of the voltmeter. The micro relay is set immediately before the firing and is adjusted so that a change of plate current will trip the relay thus automatically opening switch 32. A time delay consisting of an inductor and capacitor in parallel in the relay circuit will ensure that switch 32 is not opened before switch 20 opens.

Figure 4:
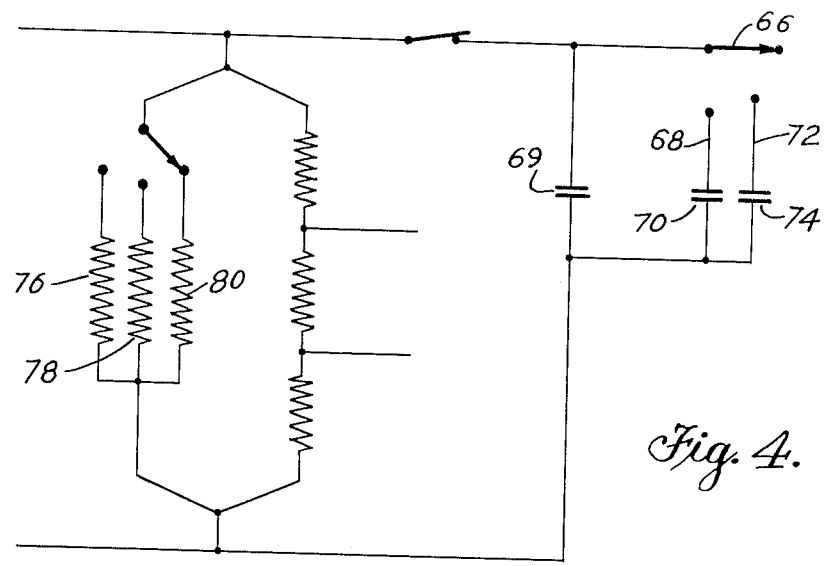
Fig. 4 shows a modification of the circuit of Fig. 2.

Fig. 4 shows a capacitor-resistor arrangement for three measuring ranges. Capacitor 69 having a capacitance of 0.5µf. is used for the high range of 100 to 200 knots by setting switch arm 66 to a neutral tap. When switch arm 66 makes contact with lead 68, capacitors 69 and 70 are connected in parallel; this combination provides an effective capacitance of 0.666µf. for the middle range of 75 to 150 knots. Similarly, when switch arm 66 contacts lead 72 placing capacitor 74 in parallel with capacitor 69, the total capacitance in the circuit is 1.0µf. for the low range of 50 to 100 knots. The overlapping range of 75 to 150 knots is useful when the speed to be measured may be greater than the maximum speed in the low range or may turn out to be less than the minimum speed in the high range. Although the capacitance of capacitors 69, 70, and 74 may be measured precisely, the measured values may not agree with the nominal values so three different shunt resistors 76, 78, and 80 are required for shunting the resistive attenuator. A ganged three position range switch may be employed which will simultaneously place the desired capacitor arrangement and the corresponding matched resistor in the measuring circuit.

Figure 5:
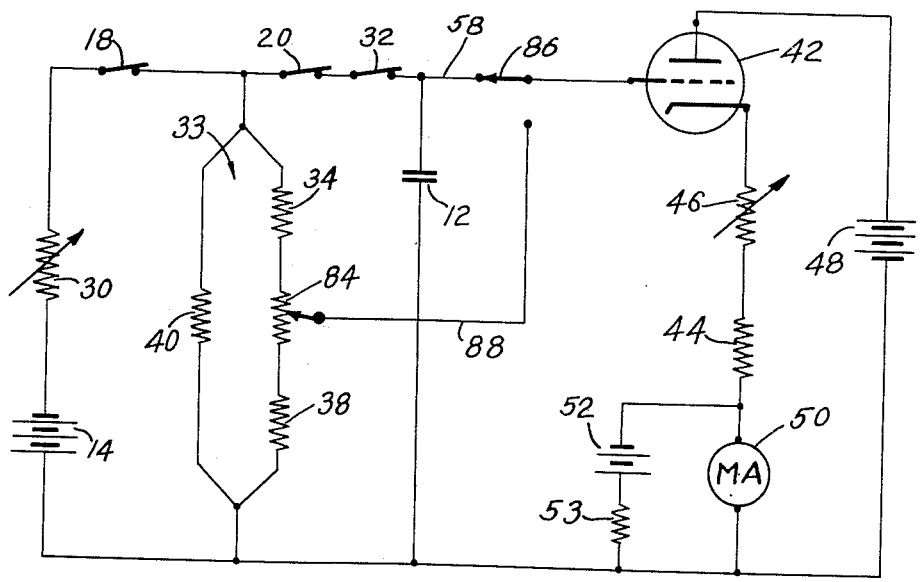
Fig. 5 is a circuit diagram of a balanced form of a speedometer embodying the invention.

The accuracy of the circuit shown in Fig. 2 depends upon the calibration and stability of the discharging circuit and also upon the linear characteristics of the voltage indicating means. It may be desirable in some cases to eliminate any residual or individual instabilities of the indicating means thus making it possible to do away with any calibration or reading of the voltmeter. This high accuracy and stability is attained by means of a balanced form speedometer shown in Fig. 5 which refers the deflection of the instrument needle or the voltage across the capacitor not only to both end marks of the scale but also to the entire measuring range of the calibrating attenuator. In Fig. 5, a precision calibrated potentiometer 84 is substituted for resistor 36 in Fig. 2, and switch 86 and lead 88 replace switch 56 and leads 60 and 62 of Fig. 2. Potentiometer 84 is fitted with a calibration scale. Other elements of the timer shown in Fig. 5 are the same as in Fig. 2.

In the operation of the balanced form speedometer, the grid of tube 42 is connected to lead 88 and the potentiometer is successively turned to both ends of its scale. At each end point of the potentiometer scale, meter 50 is adjusted to indicate end marks of the meter scale by means of resistors 30 and 46 in the same manner as in the operation of the embodiment shown in Fig. 2. Because this preadjustment concerns solely the measuring range instead of accurate scale divisions, a back and forth adjustment is unnecessary. The tube grid is now connected to lead 58 and the launching carried out. The needle of meter 50 will assume a certain deflection which is noted. The tube grid is again connected to lead 88 and potentiometer 84 is adjusted until the meter needle again reaches the noted deflection. The actual velocity of the object under test can now be read off directly from the potentiometer scale without utilizing the absolute indication or calibration of the tube voltmeter, even in voltage ratios.

The balanced type speedometer may be calibrated the same as the direct indicating type. The meter may be provided, for convenience, with a memory needle which can be manually set in any desired position by means of a small knob. The use of a memory needle obviates the necessity of remembering the needle deflection; it will be noted that with such a memory needle the meter scale is unimportant. The range of the balanced speedometer may be extended in the same manner as the circuit shown in Fig. 2 by the use of additional capacitors and shunt resistors.

Obviously many modifications and variations of the present invention are possible in the light of the above teachings. It is therefore to be understood that within the scope of the appended claims the invention may be practiced otherwise than as specifically described.

What is claimed is:

1. A direct reading speedometer which comprises a capacitor, means for impressing a direct current voltage on said capacitor, indicating means connected in parallel with said capacitor, attenuator means connected in parallel with said capacitor and including first, second and third resistors connected in series, said resistors having a fixed ratio relationship with one another, first tap means fixedly connected between said second and third resistors, second tap means fixedly connected between said first and second resistors, and switching means for selectively connecting said indicating means to said first tap means or to said second tap means or in parallel with said capacitor.

2. A device as defined in claim 1 including a resistor shunting said first, second and third resistors for reducing the resistance of the attenuator means network.

3. A direct reading speedometer which comprises a capacitor, a source of direct current voltage connected to said capacitor for impressing a voltage thereon, indicating means connected in parallel with said capacitor, a first variable resistor connected in series with said source for adjusting the indication of said indicating means at one end of the scale thereof, attenuator means connected in parallel with said capacitor and including second, third and fourth resistors connected in series, said resistors having a fixed ratio relationship with one another, first tap means fixedly connected between said third and fourth resistors, second tap means fixedly connected between said second and third resistors, vacuum tube means having the cathode thereof connected to said indicating means, a fifth variable resistor connected to said cathode for adjusting the indication of said indicating means at another end of the scale thereof, and switching means connected to the grid of said tube for selectively connecting said grid to said first tap means or to said second tap means or to said capacitor.

References Cited in the file of this patent

UNITED STATES PATENTS

| | | |
|---|---|---|
| 2,102,166 | Roberts | Dec. 24, 1939 |
| 2,177,569 | Jorgensen | Oct. 24, 1939 |
| 2,274,158 | Penther | Feb. 24, 1942 |
| 2,377,757 | Clark | June 5, 1945 |
| 2,377,969 | Richter | June 12, 1945 |
| 2,395,902 | Nisewanger et al. | Mar. 5, 1946 |
| 2,502,712 | Floyd | Apr. 4, 1950 |

FOREIGN PATENTS

| | | |
|---|---|---|
| 64,825 | Denmark | Sept. 23, 1946 |